M. O. REICHE.
SOIL TESTING APPARATUS.
APPLICATION FILED NOV. 3, 1915.
1,259,669.
Patented Mar. 19, 1918.
2 SHEETS—SHEET 1.
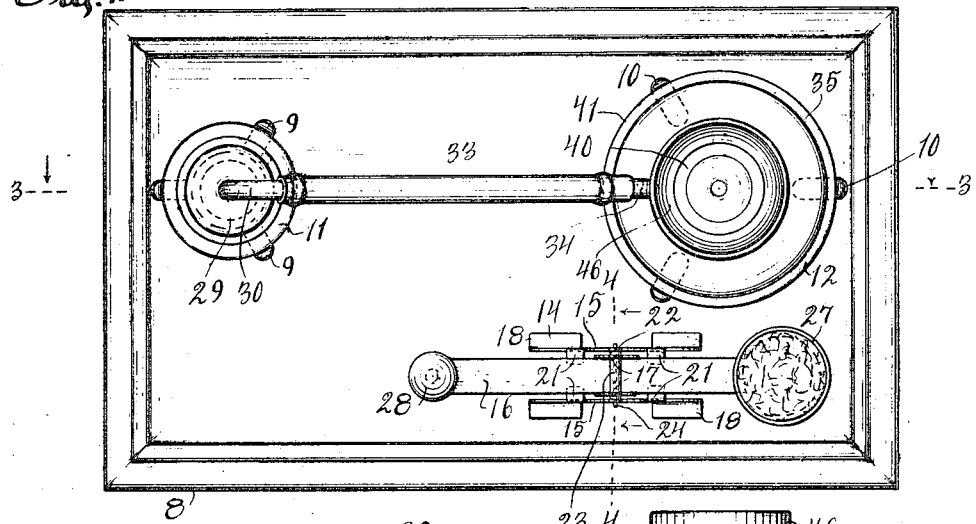
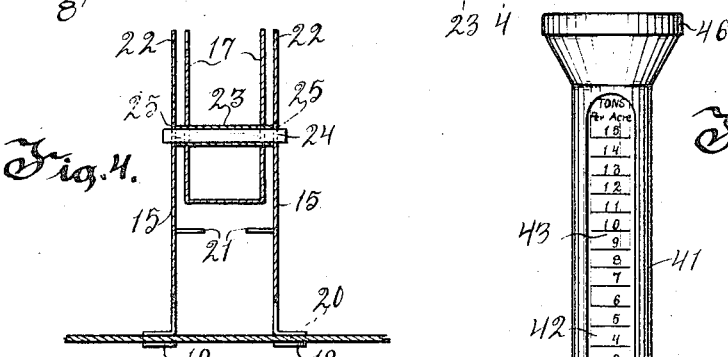
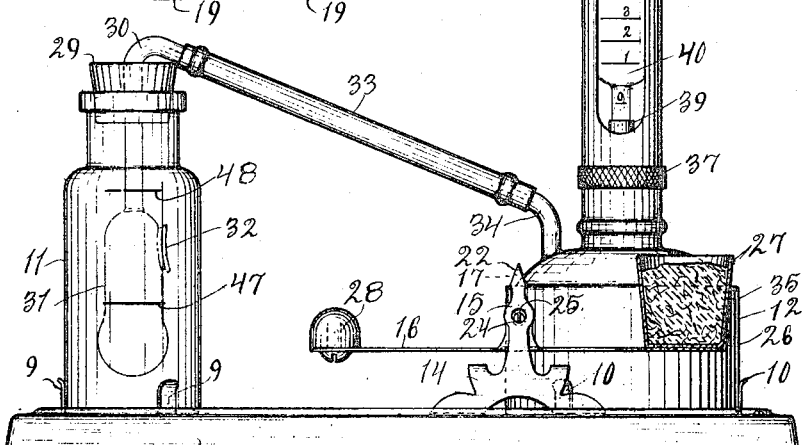
INVENTOR
Max O. Reiche
By Morsell, Keeney & French.
ATTORNEYS M. O. REICHE.
SOIL TESTING APPARATUS.
APPLICATION FILED NOV. 3, 1915.
1,259,669.
Patented Mar. 19, 1918.
2 SHEETS—SHEET 2.
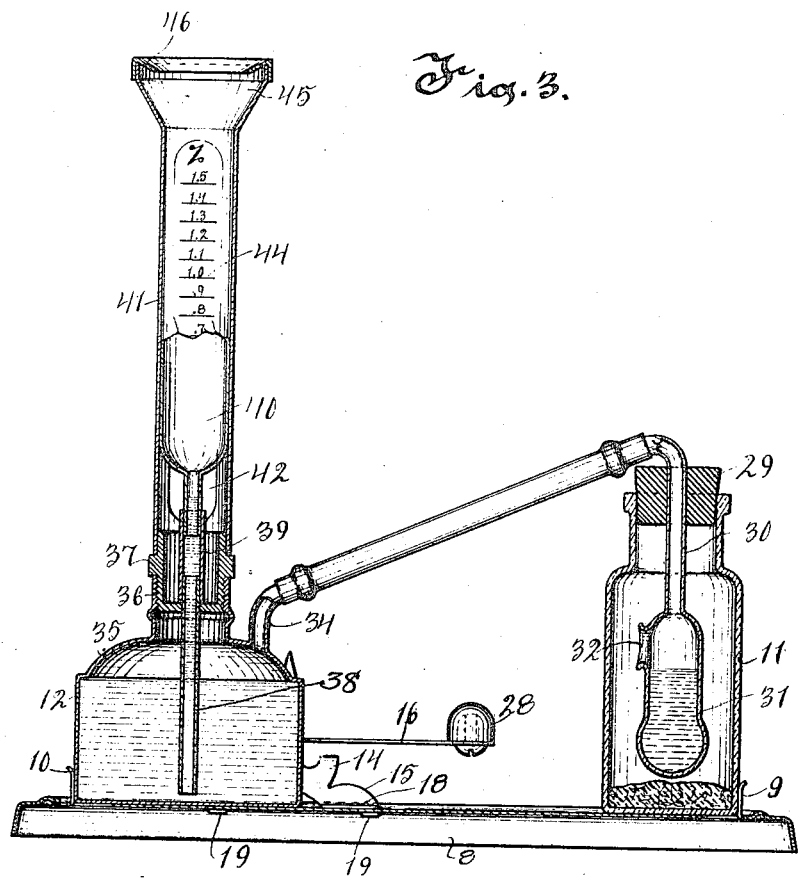
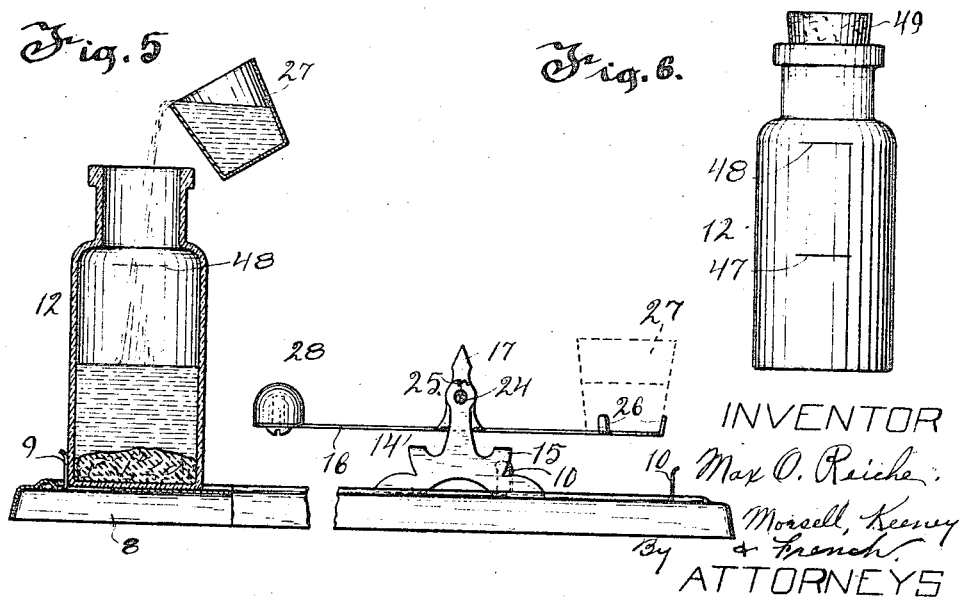
INVENTOR
Max O. Reiche.
Morsell, Keeney
& French
By ATTORNEYS

UNITED STATES PATENT OFFICE.

MAX O. REICHE, OF MILWAUKEE, WISCONSIN.

SOIL-TESTING APPARATUS.

1,259,669.  Specification of Letters Patent.  Patented Mar. 19, 1918.

Application filed November 3, 1915. Serial No. 59,351.

*To all whom it may concern:*

Be it known that I, MAX O. REICHE, a citizen of the United States, and resident of Milwaukee, in the county of Milwaukee and State of Wisconsin, have invented new and useful Improvements in Soil-Testing Apparatus, of which the following is a description, reference being had to the accompanying drawings, which are a part of this specification.

This invention relates to improvements in soil testing apparatus.

In order to get the best returns from the soil it is necessary for the farmer to have a complete understanding of its nature and shortcomings to get the maximum results in fertility and productiveness.

It is of course possible for the farmer to send samples of his soil to a laboratory, usually in a distant city, and have it tested from time to time, but this is comparatively an expensive proposition and requires considerable time and is only done in exceptional cases.

It is therefore one of the objects of the present invention to provide a soil testing apparatus of such simplicity and inexpensiveness that the ordinary farmer with a few acres of land can afford to buy one and to test his soil from time to time and maintain it at its maximum productiveness.

A further object of the invention is to provide a soil testing apparatus with which may be determined the quantity of carbonates (lime and magnesia) or lack of same in the soil by the hydrochloric acid method.

A further object of the invention is to provide a soil testing apparatus with which may be determined the degree of acidity of the soil by means of the ammonia method.

A further object of the invention is to provide a soil testing apparatus with which may be determined the quantity of digested active humus in the soil by the caustic soda method.

A further object of the invention is to provide a soil testing apparatus with which the different materials may be weighed or measured and tested in predetermined quantities and the desired results obtained by a person of ordinary intelligence and not skilled in the science of chemistry.

A further object of the invention is to provide a soil testing apparatus consisting of a plurality of parts combined and interchangeably connected together in a manner to form a unitary apparatus for performing the unitary function of testing soils to indicate various conditions and lack of desirable constituents in proper quantities.

A further object of the invention is to provide a soil testing apparatus which is of simple construction, is strong and durable and with which the test may be easily made.

With the above and other objects in view the invention consists of the improved soil testing apparatus and its parts and combinations as set forth in the claims, and all equivalents thereof.

In the accompanying drawing in which the same reference characters indicate the same parts in all of the views:

Figure 1 is a top view, in part, of the improved soil testing apparatus showing the parts for indicating quantity of carbonates in the soil;

Fig. 2 is a side view thereof, parts being shown in section;

Fig. 3 is a vertical sectional view thereof taken on line 3—3 of Fig. 1;

Fig. 4 is a transverse sectional detail view of the scale portion of the apparatus taken on line 4—4 of Fig. 1;

Fig. 5 is a side view in part of the apparatus for indicating the degree of acidity of the soil and the quantity of digested humus in the soil; and Fig. 6 is a side view of a part of the apparatus shown in Fig. 5.

Referring to the drawing the numeral 8 indicates the base member upon which the improved apparatus is mounted. The said member is of rectangular form and is preferably formed of sheet metal and is provided with upstanding spring fingers 9 and 10 for removably holding receptacles 11, 12 and 13 with which the tests are made. The base also has mounted thereon a balance scale 14 which consists of the upstanding side members 15, the scale beam 16 and the pointers 17. Members 15 have foot portions 18 and attaching tongues 19 engaging slots 20 in the base to secure said members to the base. Stops 21 are provided to limit the movement of the scale beam, and members 15 are formed with pointed upper ends 22 with which the scale beam pointers 17 are adapted to register. Pointers 17 are connected by a spacing tube 23, and a strip 24 supported in openings 25 in members 15 forms the fulcrum for the scale beam, and said beam has fingers 26 to support a cup 27 and also a weight 28 for determining the amount of soil to be tested.

The receptacle 11 which is mounted between the spring fingers 9 is in the form of a glass bottle having a stopper 29 through which extends a glass bulb tube 30. The bulb portion 31 is at the lower end of the tube 30 and is provided with a side opening 32 through which the bulb is filled with diluted muriatic acid and also emptied when the bulb is within the bottle or receptacle and the bottle contains the weighed soil from the cup. The upper end of the bulb tube 30 is bent at an angle and is connected to one end of a rubber tube 33 which at its opposite end is connected to a tubular extension 34 projecting from the body portion 35 of the test receptacle 12. The said body portion 35 is formed with a threaded opening 36 in its upper end to receive the threaded stopper 37. This stopper has a tube 38 extending therethrough which terminates at a point close to the bottom portion of the tube. The upper end of the tube is connected by means of a rubber tubular connection 39 to an open ended glass gage tube 40 which extends upwardly from the receptacle 12. A metal guard tube 41 mounted on the stopper 37 and extending upwardly therefrom and surrounding the gage tube 40 is provided with opposite side openings 42 to permit viewing the scales 43 and 44 delineated upon the opposite sides of the gage tube, the scale 43 indicating the number of tons of available carbonates (lime and magnesia) in the top six inches of soil per acre and the scale 44 indicating the percentage of carbonates in the top six inches of soil per acre. The upper open end 45 of the gage tube is flared outwardly and its upper edge is overlapped by the top portion 46 of the guard tube 41.

The bottle or receptacle 12 is similar in size and shape to the bottle or receptacle 11 and if desired both may be used interchangeably and are each provided with scale or division marks 47 and 48, the mark 47 indicating one-half the contents of the receptacle and the mark 48 indicating the full contents thereof. The receptacle 12 is provided with a solid stopper 48.

While two receptacles 11 and 12 are shown it is to be understood that one may be eliminated if desired and all of the tests performed in the one receptacle.

In using the apparatus the acid test is usually made first and is made in the following manner: Soil to a depth of approximately six inches is taken from the four corners and central portion of the field and is mixed and thoroughly dried and a small portion is screened through a fine sieve. The measuring cup is then filled with the screened soil until it brings the scale beam weight to an even balance. This weighed material is then placed in one of the bottles and the bottle is filled with preferably rain or distilled water up to the upper mark. The measuring cup is now half filled with strong ammonia and the ammonia is then poured into the bottle and the bottle is then well agitated and then after settling the color is observed. If the liquid turns a dark brown or black color, the soil is extremely acid, if it turns a dark or light yellow the soil is slightly acid, and if the liquid remains colorless the soil is neutral or alkaline. In case the test indicates that the soil is strongly acid it is of course known that it does not contain any lime and it is necessary to supply a certain amount of lime to the soil, in accordance with tables furnished and with reference to the crop it is desired to grow, and it is therefore unnecessary to make the carbonate or lime test.

In the event that the test indicates an alkaline condition the lime test is then made as follows:

The sealed test receptacle is now filled with one-half pint of clean water through the top of the test tube and the scale cup is again filled with screened and dried soil until it balances the weight of the weight beam and this soil is then emptied into one of the bottles and the bulb of the bulb tube is filled with diluted muriatic acid and is inserted in the bottle with the soil. The bulb tube is now connected to the test or gage receptacle by means of the rubber tube to form an air tight connection therebetween. More water, drop by drop, is now poured into the test receptacle until the level of water in the said test receptacle rises up to the zero mark in the scale tube. The soil receptacle is now tipped to empty the muriatic acid in the bulb on the soil in the receptacle and is then placed in upright position on the base member for about ten minutes or until the water level in the test or gage tube stops rising. The carbonic acid gas is released through the action of the muriatic acid on the carbonates of the soil and the pressure thereof on the water in the test receptacle forces a column of water upwardly in the gage tube. If the column of water only rises a short distance above the zero mark, the test indicates that there is no lime in the soil tested, but if the soil contains lime the water column will rise to the scale mark to indicate the per cent. or the per tons of lime in the top six inches of the soil per acre, thus indicating that if a certain amount of lime is required for a certain crop it will be necessary for the farmer to supply the deficiency or the difference between the amount indicated by the test and the amount required to place the soil in a condition of maximum efficiency.

In making the humus test the cup is again filled with the sifted and dried soil until it balances the scale beam weight and the weighed soil is placed in one of the bottles or receptacles and the bottle is then filled with pure water up to first mark. The cup is now filled with strong caustic soda solution and emptied into the bottle and the bottle is corked and well shaken for a few minutes. The bottle is now placed in a dish with boiling water for about ten minutes and then when settled the color of the liquid is observed. If the liquid is a dense black, non-translucent color, it indicates one per cent. or more of humus, and therefore no need of a green manure crop. If the liquid is a deep brown translucent color, it indicates one half of one per cent. of humus and is still not in need of a green manure crop. If however, the liquid is a light brown or yellowish color, it indicates a deficiency of humus and the need of a green manure crop.

While the invention has been described for the purpose of determining the carbonates and humus in the soil and also the acidity of the soil, the apparatus is also adapted for determining the presence of and quantity of carbonate of sodium in the soil. In determining this last mentioned compound the same test is made with which the amount of carbonates is determined and it is to be understood that the claims are to be construed as covering the apparatus for making this test.

While all of the before mentioned tests may be made with one bottle or receptacle it is of advantage to have more than one as the different tests may be made at the same time.

From the foregoing description it will be seen that the soil testing apparatus will enable a person unskilled in the science of chemistry to easily determine the condition of his soil and in case he finds it lacking in the necessary elements he can give it the corrective treatment indicated by the different tests.

What I claim as my invention is:

1. A soil testing apparatus, embodying a gas generating receptacle, a closure for said receptacle, and a chemical holding means removably fixed in said receptacle and provided with a tube extending to the exterior of the receptacle and a side opening communicating with the interior of the receptacle, whereby said chemical holding means forms an outlet for the gases generated in said receptacle.

2. A soil testing apparatus, embodying a combined liquid mixing and gas generating receptacle, a closure for said receptacle, a chemical holding means removably fixed in said receptacle, a sealed test receptacle having liquid measuring means for indicating the height of liquid to be contained therein, and a tubular flexible connection between said gas generating receptacle and said sealed test receptacle, whereby said gas generating receptacle can be tilted independently of the sealed test receptacle to empty the contents of the chemical holding means into the gas generating receptacle without displacing its closure.

3. A soil testing apparatus, embodying a gas generating receptacle, a closure for said receptacle, a chemical holding means in said receptacle provided with means for emptying its contents into said receptacle while said receptacle is closed, and an outlet for the gases generated in said receptacle.

4. A soil tester comprising a water container, a gage having one end projecting into said water container, a soil container, an acid bulb within said soil container provided with an opening in one side thereof and having its upper end projecting outside said soil container, and a tube connecting the outer end of the acid bulb with the water container.

5. A soil tester comprising a water container, a gage having an end projecting into said water container, a soil container, an acid bulb within said soil container provided with an opening in one side thereof, and a tube connecting the said acid bulb with the water container.

In testimony whereof, I affix my signature.

MAX O. REICHE.